(12) United States Patent
Liu et al.

(10) Patent No.: US 10,663,807 B2
(45) Date of Patent: May 26, 2020

(54) DISPLAY PANEL, DISPLAY DEVICE AND FABRICATION METHOD THEREOF

(71) Applicants: BOE Technology Group Co., Ltd., Beijing (CN); Hefei Xinsheng Optoelectronics Technology Co., Ltd., Hefei, Anhui (CN)

(72) Inventors: Xingyi Liu, Beijing (CN); Jideng Zhou, Beijing (CN); Wei Zhang, Beijing (CN)

(73) Assignees: BOE Technology Group., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 16/035,027

(22) Filed: Jul. 13, 2018

(65) Prior Publication Data

US 2019/0094582 A1 Mar. 28, 2019

(30) Foreign Application Priority Data

Sep. 26, 2017 (CN) .......................... 2017 1 0884779

(51) Int. Cl.
*G09G 3/20* (2006.01)
*G02F 1/1339* (2006.01)
(Continued)

(52) U.S. Cl.
CPC .......... *G02F 1/1339* (2013.01); *G02F 1/1345* (2013.01); *G02F 1/133514* (2013.01);
(Continued)

(58) Field of Classification Search
CPC ............. C01B 32/184; G02F 1/133514; G02F 1/1339; G02F 1/1345; G02F 2001/13398;
(Continued)

(56) References Cited

U.S. PATENT DOCUMENTS

2007/0030409 A1    2/2007  Aoki
2009/0174856 A1*   7/2009  Aoki .................... G02F 1/1345
                                                          349/153
(Continued)

FOREIGN PATENT DOCUMENTS

CN        1912717 A      2/2007
CN      102254584 A     11/2011
(Continued)

OTHER PUBLICATIONS

Office Action for corresponding CN 201710884779.1 dated Nov. 14, 2019.

*Primary Examiner* — Insa Sadio
(74) *Attorney, Agent, or Firm* — Arent Fox LLP; Michael Fainberg

(57) ABSTRACT

The present disclosure provides a display panel, a display device and a fabrication method thereof. The display panel includes: a first substrate, an opposing substrate opposite to the first substrate, a frame sealant area arranged on edges of the first substrate and edges of the opposing substrate, and a connection part connecting the first substrate with the opposing substrate in the frame sealant area, where the connection part is provided with graphenes for transmitting a first electrical signal of the first substrate to the opposing substrate or for transmitting a second electrical signal of the opposing substrate to the first substrate.

5 Claims, 3 Drawing Sheets

(51) Int. Cl.
  *G02F 1/1335*   (2006.01)
  *G02F 1/1345*   (2006.01)
  *C01B 32/184*   (2017.01)

(52) U.S. Cl.
  CPC .. *C01B 32/184* (2017.08); *G02F 2001/13398* (2013.01); *G02F 2201/121* (2013.01); *G02F 2202/02* (2013.01); *G02F 2202/16* (2013.01); *G02F 2202/28* (2013.01)

(58) Field of Classification Search
  CPC ........... G02F 2201/121; G02F 2202/02; G02F 2202/16; G02F 2202/28
  See application file for complete search history.

(56) References Cited

U.S. PATENT DOCUMENTS

| | | |
|---|---|---|
| 2015/0168788 A1 | 6/2015 | Song et al. |
| 2016/0004298 A1* | 1/2016 | Mazed .................... G06F 3/011 345/633 |
| 2018/0105724 A1 | 4/2018 | Zhang et al. |
| 2018/0224691 A1 | 8/2018 | Wu et al. |

FOREIGN PATENT DOCUMENTS

| | | |
|---|---|---|
| CN | 103864059 A | 6/2014 |
| CN | 104445167 A | 3/2015 |
| CN | 105542685 A | 5/2016 |
| CN | 106019724 A | 10/2016 |

\* cited by examiner

US 10,663,807 B2

DISPLAY PANEL, DISPLAY DEVICE AND FABRICATION METHOD THEREOF

CROSS-REFERENCE TO RELATED APPLICATION

This application claims priority of Chinese Patent Application No. 201710884779.1, filed on Sep. 26, 2017, which is hereby incorporated by reference in its entirety.

FIELD

The present disclosure relates to the field of semiconductor technologies and particularly to a display panel, a display device and a fabrication method thereof.

BACKGROUND

The Thin Film Transistor Liquid Crystal Display (TFT-LCD) has the characteristics of small volume, low power consumption, no radiation and the like, and plays a dominant role in the current market of flat panel displays. The Twisted Nematic (TN) mode is a common display mode of the TFT-LCD, where the pixel electrode and the common electrode of the TN-mode display panel are fabricated on the array substrate and the color film substrate respectively, and the liquid crystals deflect in the vertical direction to implement the display.

The liquid crystal sealing of the liquid crystal display panel is implemented by coating a round of border adhesive around the array substrate and the color film substrate. The border adhesive does not only prevent the liquid crystal from leaking but also glues the color film substrate and the array substrate together. For the TN-mode liquid crystal display of large size, there is also a gold ball for connecting the common electrode of the color film substrate in the border adhesive.

BRIEF SUMMARY

An embodiment of the present disclosure provides a display panel, which includes: a first substrate, an opposing substrate opposite to the first substrate, a frame sealant area arranged on edges of the first substrate and edges of the opposing substrate, and a connection part connecting the first substrate with the opposing substrate in the frame sealant area, where the connection part is provided with graphenes for transmitting a first electrical signal of the first substrate to the opposing substrate or for transmitting a second electrical signal of the opposing substrate to the first substrate.

Optionally, the first substrate is a color film substrate provided with a common electrode, the opposing substrate is an array substrate, and the graphenes are specifically used to transmit a common voltage signal of the array substrate to the common electrode of the color film substrate.

Optionally, the connection part is distributed in whole frame sealant area, and the graphenes are mixed in the connection part.

Optionally, a plurality of connection parts are arranged in the frame sealant area, wherein each connection part comprises a matrix and graphenes mixed in the matrix, and the plurality of connection parts are spaced with each other and distributed uniformly in the frame sealant area.

Optionally, in the frame sealant area, a gap between the connection parts is provided with frame sealants, and a texture of the matrix is same as a texture of the frame sealants.

Optionally, in the frame sealant area, a gap between the connection parts is provided with frame sealants, a display area between the opposing substrate and the first substrate is further provided with a spacer, and a texture of the matrix is same as a texture of the spacer.

Optionally, silicon ball particles are further arranged in the frame sealant area.

An embodiment of the present disclosure further provides a display device including the display panel provided by the embodiments of the present disclosure.

An embodiment of the present disclosure further provides a fabrication method of a display panel, where the fabrication method includes:

forming graphenes;

forming a connection part containing the graphenes in a frame sealant area arranged on edges of an opposing substrate;

performing box aligning on a first substrate and the opposing substrate.

Optionally, the forming a connection part containing the graphenes in a frame sealant area of an opposing substrate, includes:

forming a connection part containing the graphenes in a whole frame sealant area of an opposing substrate.

Optionally, the performing box aligning on a first substrate provided with a common electrode and the opposing substrate, includes: performing box aligning on a first substrate provided with a common electrode and the opposing substrate by adhesion of the connection part in the frame sealant area.

Optionally, before forming the connection part containing the graphenes in the whole frame sealant area of the opposing substrate, the fabrication method further includes:

mixing the graphenes with epoxy resins uniformly in a torque rheometer;

adding acrylics, ultraviolet initiators, filling agents and coupling agents to form frame sealants mixed with the graphenes.

Optionally, after forming the frame sealants mixed with the graphenes, the fabrication method further includes: adding silicon ball particles to the frame sealants mixed with the graphenes.

Optionally, before forming the connection part containing the graphenes in the whole frame sealant area of the opposing substrate, the fabrication method further includes:

dispersing the graphenes uniformly in N-methyl pyrrolidone solvents;

mixing and stirring, by a defoamation machine, the N-methyl pyrrolidone solvents with the dispersed graphenes, silicon ball particles, and epoxy resins to form the frame sealants containing the graphenes.

Optionally, the forming graphenes, includes:

mixing concentrated sulfuric acids with phosphoric acids sufficiently in a first preset volume ratio under a first preset temperature to form mixed acids;

disposing graphite and potassium permanganate in a second preset mass ratio in a first vessel, slowly adding the mixed acids which are mixed sufficiently into the first vessel in a stirring state, and heating in water bath to control a reaction system temperature to be a second preset temperature, wherein a reaction time length is a first preset time length;

after the temperature of solution in the first vessel reduces to room temperature, pouring the solution into ice water of a first preset volume, and adding hydrogen peroxide solution of a preset mass fraction dropwise until the solution presents bright yellow;

filtering liquid by a filtration membrane;

performing centrifugal separation at a first rotate speed for a second preset time length to remove unoxidized graphite;

washing sulfate radicals off repeatedly by diluted hydrochloric acids of which the concentration decreases progressively, and performing centrifugal separation at a second rotate speed for a third preset time length;

transferring products obtained by centrifugation into a second vessel, and drying the products under a third temperature for a fourth preset time length;

dispersing the obtained graphite oxides in the water and performing ultrasonic processing, and then adding hydrazine hydrates and performing a constant temperature reaction under a fourth temperature for a fifth preset time length, to obtain the graphenes.

DETAILED DESCRIPTION OF THE EMBODIMENTS

The TN liquid crystal display panel in the related art has the problem that the gold ball for conducting the common electrode of the color film substrate is difficult to be fabricated, that is, when the amount of indentation of the gold ball is too small, the transmission of the common voltage signal from the array substrate to the common electrode of the color film substrate is influenced; when the amount of indentation of the gold ball is too large, the gold ball is easy to break and lose the conductive capacity, or it causes the short circuit of the scan line or data line of the array substrate and the common electrode at the side of the color film.

The implementation processes of the embodiments of the present disclosure will be described below in details in combination with the drawings of the specification. It should be noted that the same or similar reference numbers represent the same or similar elements or the elements having the same or similar functions all the way. The embodiments described by reference to the drawings are exemplary and only used to explain the present disclosure, but not considered as the limitations of the present disclosure.

Figure 1:
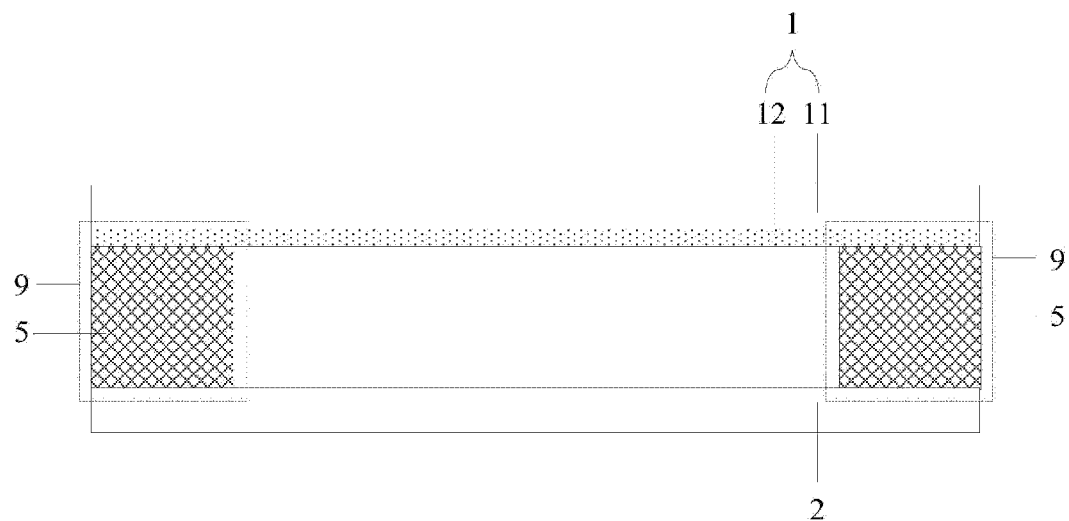
FIG. 1 is a structural schematic diagram of a section view of a display panel provided by an embodiment of the present disclosure.

Referring to FIG. 1, an embodiment of the present disclosure provides a display panel, which includes: a first substrate 1, an opposing substrate 2 opposite to the first substrate 1, a frame sealant area 9 arranged on edges of the first substrate 1 and edges of the opposite substrate 2, and a connection part 5 connecting the first substrate 1 with the opposing substrate 2 in the frame sealant area 9, where the connection part 5 is provided with graphenes for transmitting a first electrical signal of the first substrate 1 to the opposing substrate 2 or for transmitting a second electrical signal of the opposing substrate 2 to the first substrate 1.

Optionally, the first substrate 1 can be a color film substrate which can be provided with a common electrode 12 and can further include a first base substrate 11, where the common electrode 12 is arranged on the side of the first base substrate 11 facing the opposing substrate 2. The opposing substrate 2 can be an array substrate, the second signal can be a common voltage signal, and the connection part 5 is provided with the graphenes which are used to transmit the common voltage signal provided by the array substrate to the common electrode 12. Of course, in an optional implementation, the opposing substrate 2 can further be provided with a common electrode signal line (not shown in the figure) providing the common voltage signal to the common electrode 12, while the connection part 5 can be connected to the common electrode 12 at one end and connected to the common electrode signal line at the other end, so that the common voltage signal in the common electrode signal line can be transmitted to the common electrode 12 by the graphenes in the connection part 5. The arrangement of the common electrode signal line can be the same as that of the common electrode signal line in the existing TN display mode. When the first substrate is the color film substrate provided with the common electrode and the second substrate is the array substrate, the connection part connecting the color film substrate with the array substrate is arranged in the frame sealant area, and the connection part is provided with the graphenes which can transmit the common voltage signal to the common electrode of the color film substrate due to the higher electric conductivity and better bendability, to thereby avoid the problem that the array substrate cannot provide the common voltage signal to the common electrode of the color film substrate or the problem of the short circuit of the scan line or data line of the array substrate and the common electrode at the side of the color film because the amount of indentation of the gold ball is difficult to be controlled.

Figure 2:
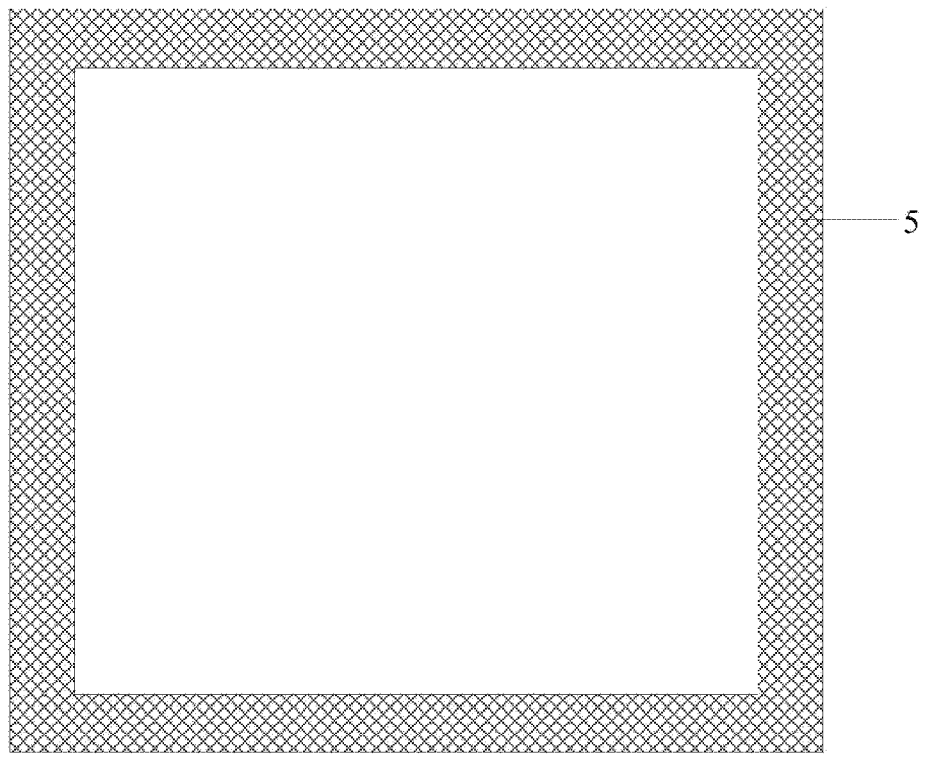
FIG. 2 is a structural schematic diagram of a top view of a display panel provided by an embodiment of the present disclosure.

Optionally, as shown in FIG. 2, the connection part 5 can be distributed in the whole frame sealant area, while the graphenes are mixed in the connection part. When the connection part 5 is distributed in the whole frame sealant area and the graphenes are mixed in the connection part, the connection part 5 can include a matrix and the graphenes mixed in the matrix. the texture of the matrix of the connection part can be the same as the texture of the frame sealants bonding the array substrate with the color film substrate, so that the graphenes transmitting the common voltage signal to the common electrode can be formed directly in the frame sealant area when the frame sealants bonding the array substrate with the color film substrate are formed without the separate fabrication of the connection part, which can simplify the fabrication process of the display panel and reduce the fabrication cost of the display panel.

Figure 3:
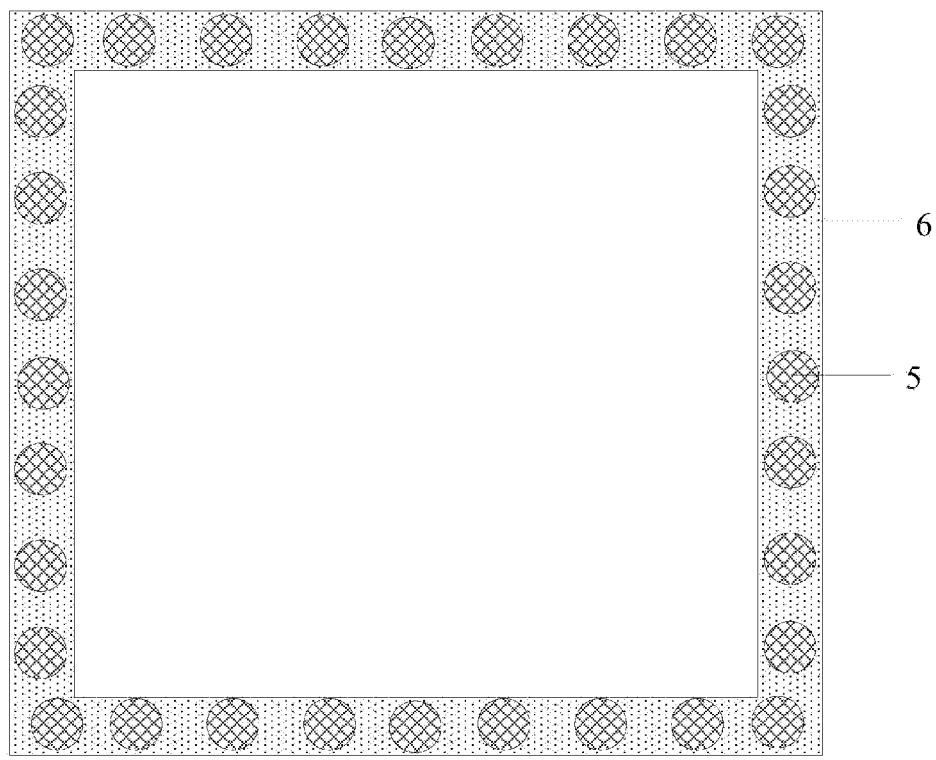
FIG. 3 is a structural schematic diagram of a top view of another display panel provided by an embodiment of the present disclosure.

Of course, as shown in FIG. 3, the connection part 5 can also be a discrete structure, that is, a plurality of connection parts 5 are arranged in the frame sealant area, where each connection part 5 includes a matrix and the graphenes mixed in the matrix, and the plurality of connection parts 5 are spaced with each other and distributed uniformly in the frame sealant area. The gap between the connection parts 5 can further be provided with the frame sealants 6, and the plurality of connection parts 5 are embedded in the frame sealants 6. Optionally, the texture of the matrix of the connection part 5 can be the same as the texture of the frame sealants. Of course, it is necessary to note that it is taken an example that the orthographic projections of the connection parts 5 on the opposing substrate are circular and the frame sealant area is only provided with a round of connection parts around the display area in FIG. 3, and the orthographic projections of the connection parts 5 on the opposing substrate can also be square, rectangular, triangular, trapezoidal or the like. The connection parts can also form a plurality of cyclic structures around the display area. Of course, in order for the simple fabrication, the connection parts can also be arranged only in the preset area of the frame sealant area, for example, the connection parts are arranged at four corners of the frame sealant area. The arrangement of the connection parts can be set according to the requirements in practice, and is not limited here.

Figure 4:
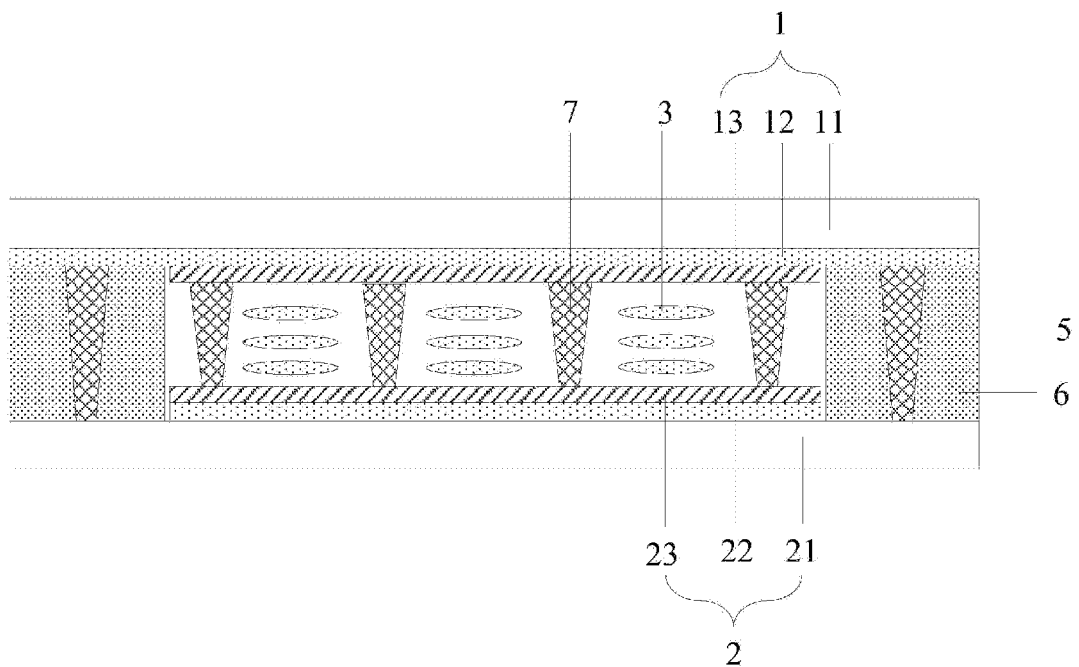
FIG. 4 is a structural schematic diagram of a section view of a display panel provided with a spacer provided by an embodiment of the present disclosure.

As shown in FIG. 4, the texture of the matrix of the connection part 5 can also be different from the texture of the frame sealants. For example, for the liquid crystal display panel, generally a spacer 7 is further arranged in the display area between the opposing substrate 2 and the first substrate 1, where the texture of the matrix of the connection part 5 can be the same as the texture of the spacer 7.

A liquid crystal layer 3 can further be arranged between the opposing substrate 2 and the first substrate 1, while the side of the first substrate 1 facing the liquid crystal layer 3 can be provided with a first orientation layer 13 in the display area, and the common electrode 12 can be arranged between the first base substrate 11 of the first substrate 1 and the first orientation layer 13. Similarly, the side of the opposing substrate 2 facing the liquid crystal layer 3 can be provided with a second orientation layer 23, and a pixel electrode 22 can further be arranged between the second orientation layer 23 and the second base substrate 21 of the opposing substrate 2. The pixel electrode cooperates with the common electrode 12, to form the electric field which can control the deflection of the liquid crystal layer 3. Of course, the opposing substrate can further include a scan line, a data line, an insulation layer and the like.

Figure 5:
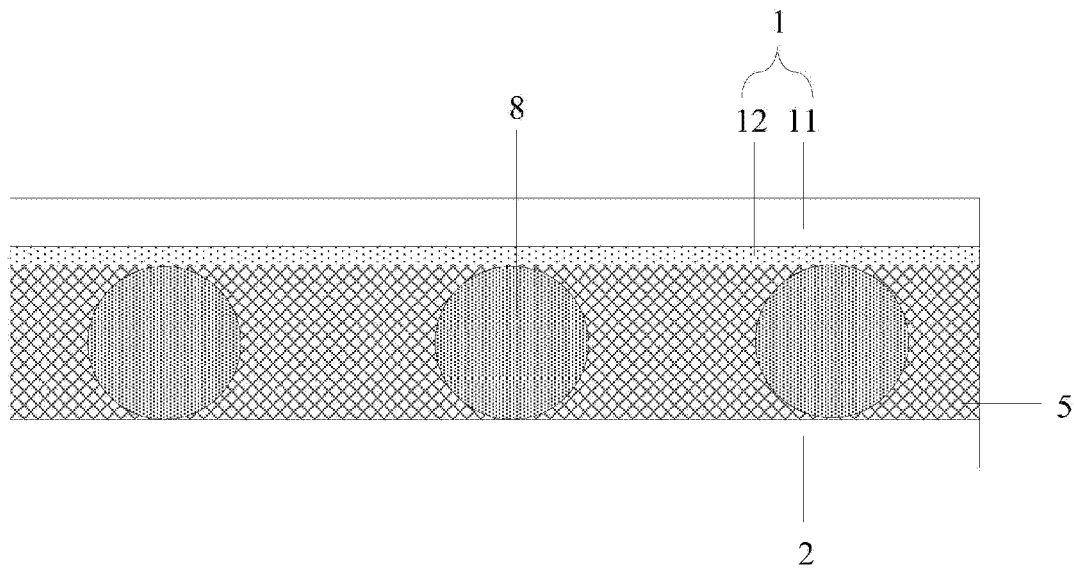
FIG. 5 is a structural schematic diagram of a top view of a display panel provided with silicon balls provided by an embodiment of the present disclosure.

In an optional implementation, the silicon ball particles are further arranged in the frame sealant area. When the silicon ball particles are further arranged in the frame sealant area, the silicon ball particles can play a role in supporting and maintaining the liquid crystal cell gap. For example, the connection part 5 is the frame sealants distributed in the whole frame sealant area, and as shown in FIG. 5, the silicon ball particles 8 are further arranged in the frame sealant area, where the diameters of the silicon ball particles are equal to the liquid crystal cell gap, i.e., equal to the vertical distance between the opposing substrate 2 and the first substrate 1.

An embodiment of the present disclosure further provides a display device including the display panel provided by the embodiments of the present disclosure.

Figure 6:
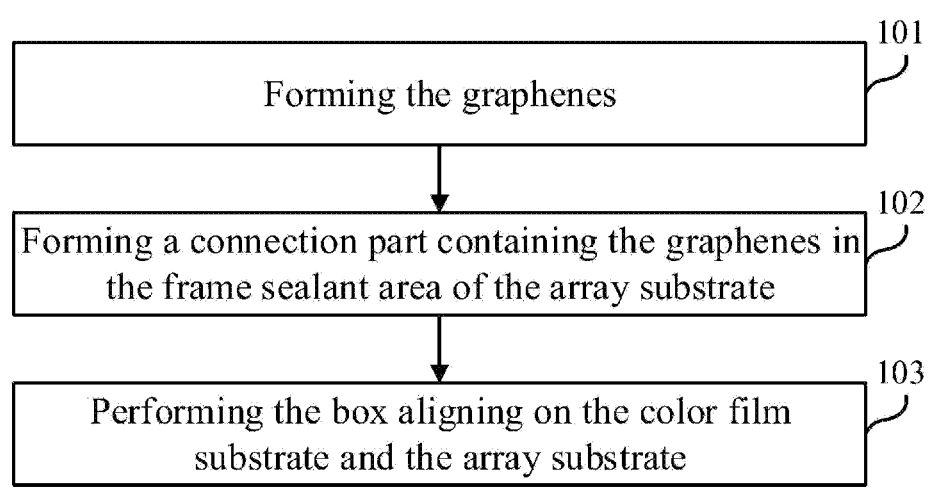
FIG. 6 is a schematic diagram of a fabrication flow of a display panel provided by an embodiment of the present disclosure.

As shown in FIG. 6, an embodiment of the present disclosure further provides a fabrication method of a display panel, where the fabrication method includes following steps.

Step 101: forming the graphenes. Optionally, the graphenes can be formed by the oxidation-reduction method, which includes followings.

Mixing the concentrated sulfuric acids with the phosphoric acids sufficiently in the first preset volume ratio under the first preset temperature to form the mixed acids.

Disposing the graphite and the potassium permanganate in the second preset mass ratio in the first vessel, slowly adding the mixed acids which are mixed sufficiently into the first vessel in the stirring state, and heating in the water bath to control the reaction system temperature to be the second preset temperature, where the reaction time length is the first preset time length.

After the temperature of the solution in the first vessel reduces to the room temperature, pouring the solution into the ice water of the first preset volume, and adding the hydrogen peroxide solution of the preset mass fraction dropwise until the solution presents bright yellow.

Filtering the liquid by a filtration membrane.

Performing the centrifugal separation at the first rotate speed for the second preset time length to remove the unoxidized graphite.

Washing the sulfate radicals off repeatedly by the diluted hydrochloric acids of which the concentration decreases progressively, and performing the centrifugal separation at the second rotate speed for the third preset time length.

Transferring the products obtained by the centrifugation into the second vessel, and drying the products under the third temperature for the fourth preset time length.

Dispersing the obtained graphite oxides in the water and performing the ultrasonic processing, and then adding the hydrazine hydrates and performing the constant temperature reaction under the fourth temperature for the fifth preset time length, to obtain the graphenes.

Step 102: forming a connection part containing the graphenes in the frame sealant area of the opposing substrate. Optionally, forming a connection part containing the graphenes in the frame sealant area of the opposing substrate, specifically includes: forming a connection part containing the graphenes in the whole frame sealant area of the opposing substrate.

Step 103: performing the box aligning on the first substrate and the opposing substrate.

Optionally, performing the box aligning on the first substrate provided with the common electrode and the opposing substrate, specifically includes: performing the box aligning on the first substrate and the opposing substrate by adhesion of the connection part in the frame sealant area.

In an optional implementation, with respect to the step 102, before forming the connection part containing the graphenes in the whole frame sealant area of the opposing substrate, the frame sealants containing the graphenes can be formed firstly and can be formed by the doping or solution intercalation method, which will be illustrated below.

First method: mixing the graphenes with the epoxy resins uniformly in a torque rheometer; and adding the acrylics, ultraviolet initiators, filling agents and coupling agents to form the frame sealants mixed with the graphenes. Here, the epoxy resin is the major ingredient of the frame sealant in the related art. Optionally, after forming the frame sealants mixed with the graphenes, the fabrication method further includes: adding the silicon ball particles to the frame sealants mixed with the graphenes.

Second method: dispersing the graphenes uniformly in the N-methyl pyrrolidone solvents; and mixing and stirring, by a defoamation machine, the N-methyl pyrrolidone solvents with the dispersed graphenes, the silicon ball particles, and the epoxy resins to form the frame sealants containing the graphenes.

An embodiment of the present disclosure further provides a specific fabrication method of the graphene, where the fabrication method is as follows.

98% $H_2SO_4$ of 120 mL is sufficiently mixed with $H_3PO_4$ of 14 mL, and the temperature is controlled to be 30□ to 40□. The milled graphite of 1 g and $KMnO_4$ of 6 g are weighed and disposed in a flask with three necks, the mixed acids which are mixed sufficiently are slowly added in into the flask with three necks in the stirring state, and then the heating in the water bath is performed to control the reaction system temperature to be 50☐ for 12 h. After the reaction stops and after the flask with three necks cools to the room temperature, the solution is poured into the ice water of 200 mL. Then 30% $H_2O_2$ is added dropwise until the solution presents bright yellow. The above-mentioned liquid is filtered by a filtration membrane to achieve the liquid separation. In the separation, at first the unoxidized graphite are removed by the low-speed centrifugation, where the rotate speed is 4000 r/min and the centrifugal separation time is 5 min. Firstly the centrifugal separation is performed on the above-mentioned solution, secondly the sulfate radicals are washed off respectively by the diluted hydrochloric acids of which the concentration can decrease progressively, and then the rotate speed is increased to perform the centrifugation. Finally the products obtained by the centrifugation are transferred into a beaker, the rim of the beaker is covered by the plastic wrap, a hole is poked in the rim of the beaker, and the products are dried under 50☐ for 3 to 4 days. The obtained graphite oxides are dispersed in the water and the ultrasonic processing is performed on them, and then the hydrazine hydrates are added and the constant temperature reaction is performed under 100☐ for 24 h to obtain the graphenes.

Of course, when the graphenes in the embodiments of the present disclosure are fabricated according to the above-mentioned method, the parameters can be set according to the actual requirements, and the present disclosure is not limited thereto.

The beneficial effects of the embodiments of the present disclosure are as follows: in the embodiments of the present disclosure, the connection part connecting the first substrate with the opposing substrate is arranged in the frame sealant area, and the connection part is provided with the graphenes which can transmit the first electrical signal of the first substrate to the opposing substrate or transmit the second electrical signal of the opposing substrate to the first substrate due to the higher electric conductivity and better bendability, to thereby avoid the problem that the signals cannot be transmitted between two substrates of the display panel because the amount of indentation of the gold ball is difficult to be controlled.

Evidently those skilled in the art can make various modifications and variations to the present disclosure without departing from the spirit and scope of the present disclosure. Thus the present disclosure is also intended to encompass these modifications and variations therein as long as these modifications and variations to the present disclosure come into the scope of the claims of the present disclosure and their equivalents.

What is claimed is:

1. A fabrication method of a display panel, comprises:
forming graphenes;
forming a connection part containing the graphenes in a frame sealant area arranged on edges of an opposing substrate; and
performing box aligning on a first substrate and the opposing substrate;
wherein the forming a connection part containing the graphenes in a frame sealant area arranged on edges of an opposing substrate, comprises:
forming a connection part containing the graphenes in a whole frame sealant area of the opposing substrate;
wherein before forming the connection part containing the graphenes in the whole frame sealant area of the opposing substrate, the fabrication method further comprises:
mixing the graphenes with epoxy resins uniformly in a torque rheometer; and
adding acrylics, ultraviolet initiators, filling agents and coupling agents to form frame sealants mixed with the graphenes.

2. The fabrication method of claim 1, wherein the performing box aligning on a first substrate provided with a common electrode and the opposing substrate, comprises:
performing box aligning on a first substrate provided with a common electrode and the opposing substrate by adhesion of the connection part in the frame sealant area.

3. The fabrication method of claim 1, wherein after forming the frame sealants mixed with the graphenes, the fabrication method further comprises: adding silicon ball particles to the frame sealants mixed with the graphenes.

4. The fabrication method of claim 1, wherein before forming the frame sealants containing the graphenes in the whole frame sealant area of the opposing substrate, the fabrication method further comprises:
dispersing the graphenes uniformly in N-methyl pyrrolidone solvents; and
mixing and stirring, by a defoamation machine, the N-methyl pyrrolidone solvents with the dispersed graphenes, silicon ball particles, and epoxy resins to form the frame sealants containing the graphenes.

5. The fabrication method of claim 1, wherein the forming graphenes, comprises:
mixing concentrated sulfuric acids with phosphoric acids sufficiently in a first preset volume ratio under a first preset temperature to form mixed acids;
disposing graphite and potassium permanganate in a second preset mass ratio in a first vessel, slowly adding the mixed acids which are mixed sufficiently into the first vessel in a stirring state, and heating in water bath to control a reaction system temperature to be a second preset temperature, wherein a reaction time length is a first preset time length;
after the temperature of solution in the first vessel reduces to room temperature, pouring the solution into ice water of a first preset volume, and adding hydrogen peroxide solution of a preset mass fraction dropwise until the solution presents bright yellow;
filtering liquid by a filtration membrane;
performing centrifugal separation at a first rotate speed for a second preset time length to remove unoxidized graphite;
washing sulfate radicals off repeatedly by diluted hydrochloric acids of which the concentration decreases progressively, and performing centrifugal separation at a second rotate speed for a third preset time length;
transferring products obtained by centrifugation into a second vessel, and drying the products under a third temperature for a fourth preset time length; and
dispersing the obtained graphite oxides in the water and performing ultrasonic processing, and then adding hydrazine hydrates and performing a constant temperature reaction under a fourth temperature for a fifth preset time length, to obtain the graphenes.

* * * * *